Figure 1:
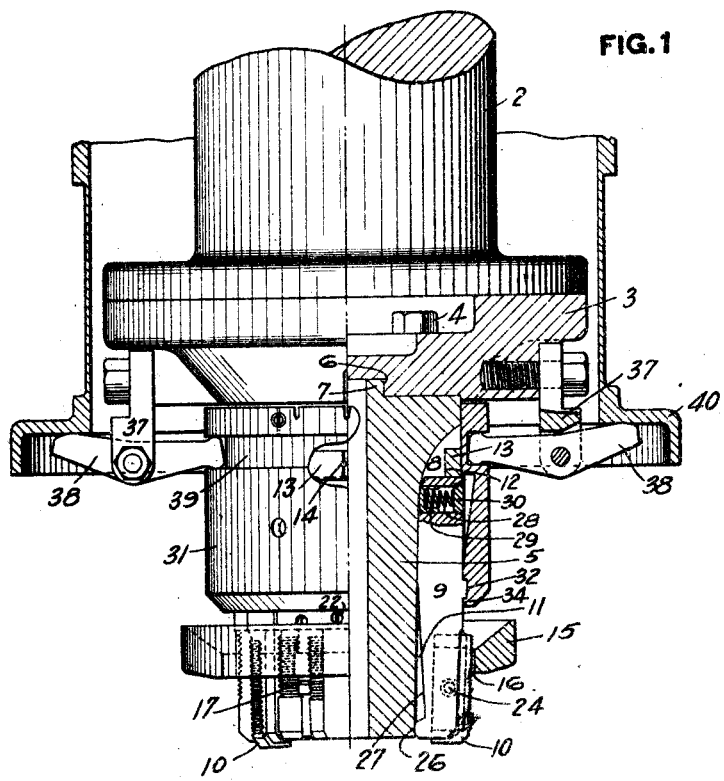

O. W. BERG.
COLLAPSING TAP.
APPLICATION FILED MAY 10, 1916.

1,195,436.

Patented Aug. 22, 1916.
2 SHEETS—SHEET 1.

WITNESSES

INVENTOR
O. W. Berg
by C. C. Linthicum
his Attorney

O. W. BERG.
COLLAPSING TAP.
APPLICATION FILED MAY 10, 1916.
1,195,436.
Patented Aug. 22, 1916.
2 SHEETS—SHEET 2.
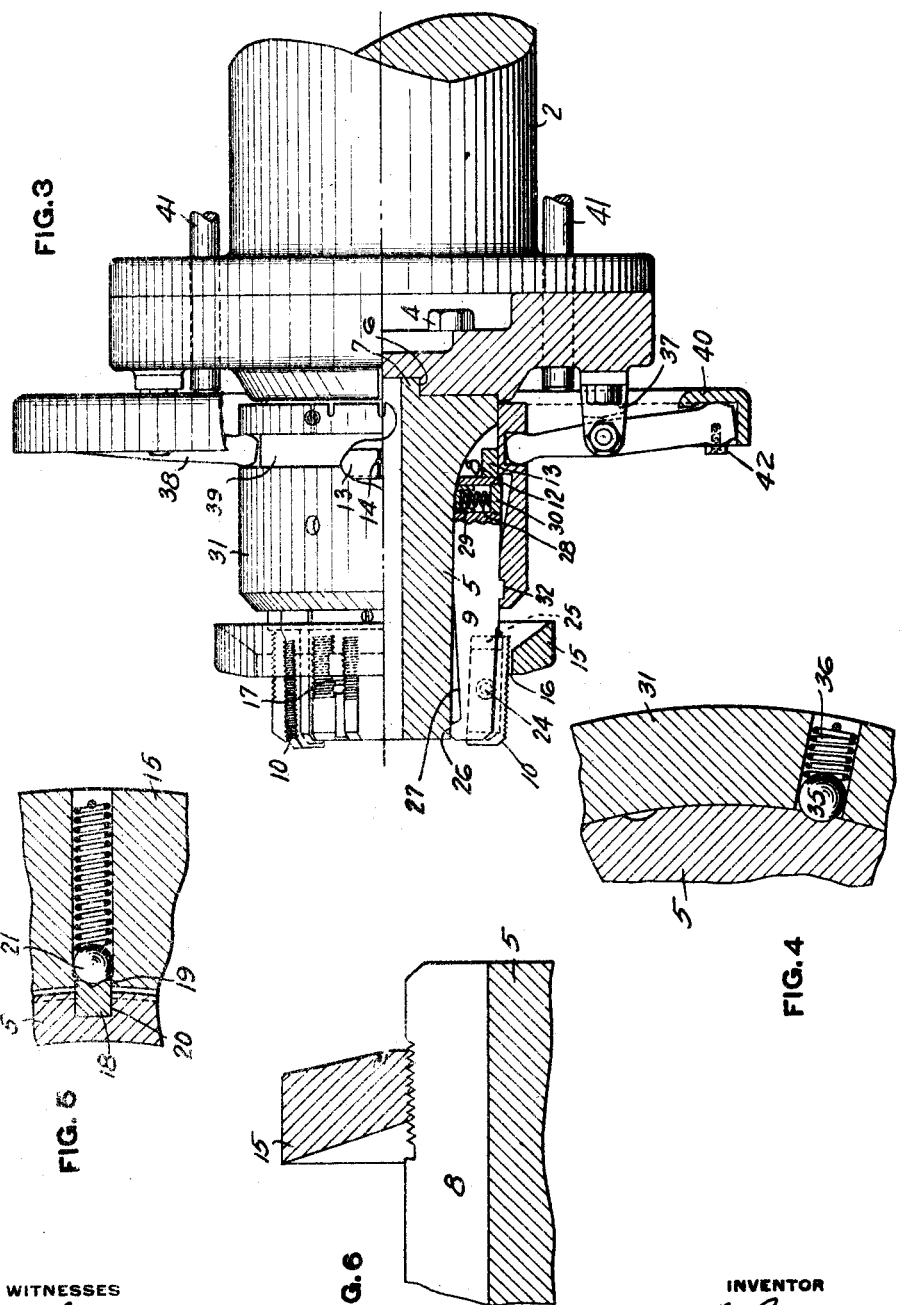
WITNESSES
INVENTOR
O. W. Berg
by C. C. Linthicum
his Attorney

UNITED STATES PATENT OFFICE.

OSCAR W. BERG, OF KEWANEE, ILLINOIS, ASSIGNOR TO NATIONAL TUBE COMPANY, OF PITTSBURGH, PENNSYLVANIA, A CORPORATION OF NEW JERSEY.

COLLAPSING TAP.

1,195,436.  Specification of Letters Patent.  Patented Aug. 22, 1916.

Application filed May 10, 1916. Serial No. 96,569.

*To all whom it may concern:*

Be it known that I, OSCAR W. BERG, a citizen of the United States, and resident of Kewanee, in the county of Henry and State of Illinois, have invented certain new and useful Improvements in Collapsing Taps, of which the following is a specification.

My invention relates to the construction of collapsing taps used on tapping machines or other machine tools employed in threading internally or tapping, and counter-sinking, pipe fittings such as elbows, T's, crosses, or similar articles.

One object of my invention is to provide a collapsing tap which is adapted for use on both horizontal and vertical tapping machines, having novel means whereby the thread cutting tools or "chasers" are moved into and out of thread cutting position.

Another object of my invention is to provide a collapsing tap having novel means whereby the tools or chasers are maintained in operative position and are held in inoperative or collapsed position while the rotary spindle of the tapping machine is being advanced and retracted lengthwise in the threading operations.

A further object of the invention is the provision of a collapsing tap having the novel constructions, combinations and arrangement of parts shown in the drawings, pointed out in the appended claims, and to be more fully described hereinafter.

Figure 2:
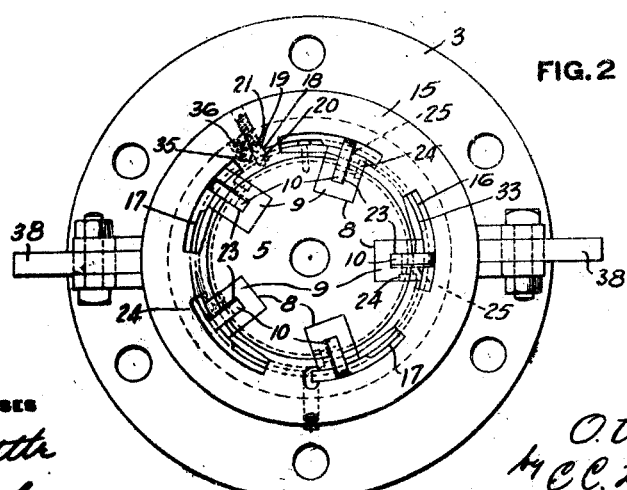

Referring now to the drawings forming part of this specification, Figure 1 is a plan, partly in section, showing a collapsing tap, adapted for use on a vertical tapping machine, as constructed and arranged in accordance with my invention. Fig. 2 is an end elevation of the collapsing tap shown in Fig. 1. Fig. 3 is a plan, partly in section, similar to Fig. 1, showing a collapsing tap constructed and arranged in accordance with my invention, and adapted for use in connection with a horizontal tapping machine. Fig. 4 is a detail section, showing on a larger scale, the means for yieldingly holding the sliding sleeve in adjusted position on the tap body. Fig. 5 is a similar detail section, showing the means employed to maintain the trip ring in position on the tap body. Fig. 6 is a sectional detail, showing the way the trip ring is rotatably mounted on the body of the collapsing tap.

In the accompanying drawings, in which like parts have the same reference numerals applied thereto, the numeral 2 designates the rotary barrel or spindle of a tapping machine to which a flange 3 is bolted or otherwise secured. Fastened to the flange 3 by bolts 4 is the tap body 5, the abutting faces of the flange 3 and body 5 having a cylindrical recess 6 registering with an annular projection 7, which co-act to center the tap body axially on the spindle 2.

The periphery or external surface of the tap body 5 is provided with a series of milled or otherwise formed slots or grooves 8, which extend lengthwise parallel with the axis of the tap body and in which the cases 9 for the thread cutting chasers 10 are adjustably secured. The bottoms 11 of the slots 8 are inclined to the axis of the tap body and taper at an angle corresponding to the taper of the thread cut on the fittings by the tap.

As shown, the tap body has five equally spaced slots 8, although the number will vary with the size of the tap to suit the number of thread cutters or chasers required or used.

Near the rear end of the tap body 5 is a circumferential groove 12 in which a split ring 13 is inserted. The ring 13 extends across the rear ends of the longitudinal slots 8 and forms a stop which limits the rearward movement of the cases 9 and chasers 10. Rotation of the ring 13 within the groove 12 is prevented by the pin 14 which is tightly driven or otherwise secured in a hole in the bottom of the groove 12 so as to project upwardly within the groove into engagement with the opposite notches in two abutting ends of the split ring 13 (as is shown in Fig. 1).

Mounted on the front end of the tap body 5 is an adjustable trip ring 15 having an internal thread which is interrupted by transverse slots 16, and which engages with registering threads 17 on the outer surface of the tap body. The trip ring 15, which is rotatable relative to the tap body 5 in adjusting the ring lengthwise on the tap body, is held in the desired position by a key 18 loosely fitted within registering slots 19 and 20, in opposite threaded sections of the body 5 and ring 15. The key 18 is held in position by a spring-pressed ball 21 which extends into a depression in one face of the key. A round head cap-screw 22 which is screwed into a tapped opening in one threaded portion of the tap body 5, (see Fig. 1) provides an adjustable stop for limiting the rearward movement of the trip ring 15 on the tap body.

The chasers or thread cutters 10 are secured in slots 23 in the cases 9 by means of fillister-head screws 24 which fit into tapped holes in the chasers. The chasers or cutters 10 are positioned and held against longitudinal movement in the cases 9 by projections 25 on the side walls of the longitudinal slots 23 in the cases 9, the projections fitting into depressions or grooves in the sides of the cutters or chasers 10. The counter-bored holes in the chasers for the fillister-head screws 24 are slightly larger than the screws so as, when found necessary, to allow a slight radial adjustment of the chasers in their cases. The cases 9 fit neatly within the slots 8 in the outer surface of the tap body 5 so as to freely move or slide longitudinally therein.

On the lower surface at the front end of each of the cases 9 is a narrow bearing surface 26 which slides on the inclined bottom surface 11 of the slots 8 in which the cases are positioned. Behind the bearing surface 26 the side 27 of the cases is cut away for about one-half its length, and on the rear end of each of the cases is a helical spring 28 which presses a spring cup 29 against the bottom 11 of the slots 8, the spring being held in position by the screw threaded plug 30 at the outer end of the transverse opening in the case in which the spring 28 is positioned.

A sleeve 31 having a sliding fit on the outer surface of the tap body 5 is arranged to move lengthwise thereon, and on the inner surface of this sleeve, near its front end, is an annular groove 32. A series of transverse slots 33 provided in the front of the annular groove 32 permit positioning the cases 9 within the slots 8 when the sleeve 31 is turned angularly to bring the transverse slots 33 in the ring into register with the slots 8 of the tap body. After the cases 9 are placed in the slots 8 the sleeve 31 is again turned axially through a part of a revolution so as to cause the side wall of the annular groove 32 to engage the projections 34 on the outer surfaces of the cases and hold the cases in position on the ring or sleeve 31.

The sleeve 31 is held in the desired position with respect to the tap body 5 by means of a spring-pressed ball 35 which is caused to extend into and is yieldingly held in the grooves in the tap body by means of a spring 36. Suitable marks are provided on the outer surface of the sleeve 31 at its rear end and on the adjoining surface of the flange 2 in order to indicate the position of the sleeve relative to the tap body 5.

Clevises 37 (two, as shown) are bolted to the flange 3 and a lever 38 is pivotally secured to each clevis. The inner ends of the levers 38 enter the annular slot 39 in the outer surface of the rear end of the sleeve 31 and the outer ends of these levers engage the expander ring 40.

In the tap of Figs. 1 and 2 the expander ring 40 moves downwardly by gravity and is made of a weight slightly less than sufficient to retract the sleeve 31 and move the cases and chasers backwardly on the tap body into the position shown after the cases collapse at the end of each threading operation.

The spindle 2 of the threading machine on which the collapsing taps are mounted is provided at its rear end with a lead screw, and a split lead nut is secured to the frame of the machine. The lead nut when closed engages with the lead screw on the end of the spindle to mechanically feed the spindle forwardly, and thereby bring the chasers into thread cutting engagement with the article being tapped or threaded. This lead screw and nut being an old and well known mechanism and not forming part of this invention, is not shown or further described.

The construction of this expanding tap, which has been described, is the same in both the vertical tap of Figs. 1, 2, and 3, and the horizontal tap of Figs. 4 and 5.

In the horizontal tap of Figs. 4 and 5 three expander pins 41 are fixed to the frame of the tapping machine, in position to engage with the rear side of the expander ring 40 when the tap and spindle are moved backwardly into retracted position, and, by such engagement, to expand the cutters or chasers 10 into cutting position.

The outer ends of the levers 38 are pivotally connected by means of straps 42 to the expander ring 40 of Fig. 3, so as to cause backward movement of the ring 40 when the chasers and cases and the sleeve 31 connected to the cases move forwardly on the tap body 5 during the first part of the thread cutting operations.

The operation of my improved tap will be readily understood. In using the collapsing tap the rotary spindle or barrel 2 is moved forwardly by the lead screw operating in the split lead nut, so that the thread cutters or chasers 10 form the desired thread in the fitting, which is securely clamped and held stationary in a chuck or holder in the proper position relative to the rotating tap. A short time prior to when the tapping operation has progressed sufficiently to move the trip ring 15 into contact with the end of the pipe fitting being tapped, the split lead nut at the rear of the spindle 2 is (either automatically or manually) disengaged from the lead screw. The further forward movement of the spindle 2 necessary to complete the cutting of the thread is effected by the travel of the chasers 10 in the threads already cut in the pipe fitting. When the trip ring 15 engages with the face of the fitting being tapped further forward or lengthwise movement of the tap body 5 is prevented thereby, but the chasers 10 continue to move forwardly, following the thread in the fitting, and cause the cases 9, together with the sleeve 31, to continue to advance.

When the cases have advanced sufficiently the narrow bearing surfaces 26 on the front ends of the cases 9 slip over the outer ends of the slots 8 in the tap body 5 and the chasers 10 and cases 9 collapse so as to be clear of the thread now cut in the pipe fitting. This collapsing movement of the chasers 10 from contact or engagement with the thread in the fitting is assisted by the springs 28 in the rear end of the cases, the springs forcing the rear end of the cases into the longitudinal slots or grooves 31ª provided therefor in the inner surface of the sleeve 31 and causing the cases 9 to rock as on a fulcrum about the middle of the projections on the lower surfaces thereof. The forward movement of the sleeve, through the levers 38, causes the expander ring 40 to move rearwardly with respect to the tap body 5.

When the tapping operation is completed and the chasers 10 have been collapsed and withdrawn from the thread in the fitting, the spindle 2 is moved rearwardly, preferably by means of a power cylinder operating through a lever attached to the end of the spindle 2. In this rearward movement the expander ring 40 of the apparatus of Figs. 4 and 5 engages with the ends of the expander pins 41 and is thereby prevented from further rearward movement. The spindle 2 and tap body 5, however, continue their rearward movement, and after the rearward movement of the expander ring 40 has been stopped by the expander pins 41 the sleeve 31 actuated by the levers 38 moves rearwardly with respect to the tap body and causes the cases 9 to be drawn backwardly into cutting position, with the bearing surfaces 26 at their front ends resting on the bottom 11 of the slots 8 in the tap body, and the chasers 10 are thereby again expanded to the proper position for cutting another thread in a new fitting. The split ring 13 on the tap body limits the rearward movement of and forms a substantial support for the cases 9 during the thread cutting operations.

By tapering the bottom 11 of the slots 8 in the tap body 5 instead of making straight slots and tapering the threads on the chasers, the work to be done in cutting the thread after the lead nut is released is reduced to a minimum, which lessens the sidewise thrust on the cases during the period in which they are drawn forward in the slots by reason of the chasers following the cut thread in the pipe fitting. In this way the longitudinal pressure which must be exerted by the chasers when the thread already cut on the fitting is acting as a lead nut is reduced to a minimum and eliminates the otherwise possible injury to the thread by scraping.

The length of thread cut in the fittings is adjusted to the proper gage by means of the trip ring 15. When the thread does not gage properly the key 18 is withdrawn and the trip ring 15 is turned until the interrupted threads on the tap body and trip ring are disengaged, when the trip ring may be moved forwardly or backwardly, the direction depending upon whether the thread gages too large or too small. The ring 15 is then turned so that the sections of interrupted thread are again in engagement, and the key 18 reinserted in place. The trip ring stop prevents the trip ring from being set so far back as to cause liability of the ends of the taps interfering with each other when cutting threads at right angles, as T's or elbows.

The particular collapsing tap described above, shown in Figs. 1 and 2, is adapted for use on a horizontal spindle machine. Although the tap for a vertical spindle machine as actually used is slightly different from this tap, it is evident that the apparatus of Figs. 1 and 2 may be used interchangeably on both vertical and horizontal spindle machines, the only change necessary in using the tap as a vertical tap on a vertical spindle machine being that the expander ring 40 must not be heavier than the combined weights of the sleeve 31, cases 9, and chasers 10. Otherwise, when collapsed at the end of the tapping operation, the weight of the expander ring 40 would be sufficient to lift and thereby expand the collapsed cases and chasers into operating position before the tap has been entirely withdrawn from the fitting upon which it is operating.

In the case of a vertical spindle machine, such as is shown in Figs. 1 and 2, the weight of the spindle 2 and tap is balanced by a counterweight, and the movements of the spindle when not in operation and when the lead nut is disengaged, are controlled by the operator through a conveniently attached handle or lever. The horizontal spindles are moved by fluid pressure cylinders through the proper levers when the lead nuts are disengaged and the tap is not cutting. The lead nut in either case is disengaged automatically when the trip ring is about to come into engagement with the face of the fitting and may be arranged to be reëngaged either automatically or by the operator.

The advantages of my invention will be apparent to those skilled in the art. In the use of my improved tap the successively tapped fittings have internal threads cut therein of uniform length and taper. The chasers are mechanically collapsed and withdrawn from the threaded fittings and the necessity of unscrewing the tap from the threaded fittings is avoided and overcome. Advancement of the collapsed chasers on the tap body in retracting the tap is prevented and the chasers are automatically moved backwardly out of collapsed position into threading position at the end of the backward movement of the tap body.

Modifications in the construction and arrangement of the parts forming my improved tap may be made without departing from the invention defined and specifically pointed out in the appended claims.

I claim:

1. A collapsing tap comprising a tap body having a plurality of slots on the periphery thereof, chasers mounted in said slots to move lengthwise on and also relatively to said tap body, said chasers being adapted to rock in said slots in collapsing, means for holding the chasers in expanded position on the tap body, yielding means for rocking and thereby moving the chasers into collapsed position on said tap body, a trip ring adjustably secured on the tap body for causing movement of the chasers relative to the tap body in collapsing the chasers at the completion of the thread cutting operations, a sliding sleeve on the tap body to which said chasers are pivotally secured, a lever mechanism pivoted on the said tap body and having one end thereof operatively connected to said sleeve, and means connected to said lever mechanism for automatically retracting the sleeve on the tap body during backward movement of the tap body to thereby move the collapsed chasers into thread cutting position on said tap body.

2. A collapsing tap comprising a rotatable tap body, said tap body having a plurality of lengthwise parallel slots on the periphery thereof, chasers pivotally secured in said slots and adapted to move forwardly lengthwise with the tap body during the thread cutting operations, said chasers being arranged to move lengthwise relatively to the tap body into collapsed position, means for rocking the pivoted chasers when in collapsing position, said rocking means being arranged to hold the chasers in collapsed position during part of the rearward movement of the tap body, and means for moving the collapsed chasers backwardly relative to the tap body into thread cutting position in said rearward movement of said tap body.

3. A collapsing tap comprising a positively rotated lengthwise movable tap body, said tap body having a plurality of slots in the periphery thereof, collapsing cases mounted in said slots and arranged to move lengthwise with and also relative to the tap body, said cases having removable chasers adjustably secured thereon, a sliding sleeve on the tap body to which the cases are pivotally secured, a lever mechanism on the tap body pivotally connected to said sleeve, and means coacting with said lever mechanism for actuating said sleeve and retracting the cases on the tap body in moving the collapsed chasers into the thread cutting position during rearward movement of the tap body.

4. A collapsing tap comprising a rotary and lengthwise movable tap body, said tap body having a plurality of slots in the periphery thereof, chasers movably mounted in said slots, a sliding sleeve on the tap body arranged to move the chasers relative to the tap body, a lever mechanism on the tap body operatively connected to said sleeve, means operatively engaging said lever mechanism for actuating the sleeve to move the chasers rearwardly in said slots, and means adjustably secured on said tap body arranged to limit the forward movement of the tap body and cause a relative forward movement of the chasers into collapsed position on said tap body.

5. A collapsing tap comprising a rotary and lengthwise movable tap body, said tap body having a plurality of slots in the periphery thereof, chasers movably mounted in said slots, a sliding sleeve on the tap body arranged to move the chasers relative to the tap body, a lever mechanism on the tap body operatively connected to said sleeve, means operatively engaging said lever mechanism for actuating the sleeve to move the chasers rearwardly in said slots, means adjustably secured on said tap body arranged to limit the forward movement of the tap body and cause a relative forward movement of the chasers into collapsed position on said tap body, and yielding means for holding the chasers in collapsed position at the beginning of the rearward movement of the tap body.

6. A collapsing tap comprising a reciprocating, positively rotated tap body, said tap body having a plurality of lengthwise parallel slots in the periphery thereof, cases movably mounted in said slots and having removable chasers adjustably secured thereon, a sliding sleeve on the tap body to which the chasers are pivotally secured, a lever mechanism pivoted on the tap body and pivotally connected to said sleeve, means engaging the lever mechanism to yieldingly move the tap body lengthwise with the chasers during part of the thread cutting operation, and a trip ring adjustably mounted on the tap body and arranged to cause a relative movement of the chasers on the tap body to thereby complete the threading operation and collapse the chasers when the pre-determined length of thread is cut.

7. A collapsing tap comprising a reciprocating, positively rotated tap body, said tap body having a plurality of lengthwise parallel slots in the periphery thereof, cases movably mounted in said slots and having removable chasers adjustably secured thereon, a sliding sleeve on the tap body to which the chasers are pivotally secured, a lever mechanism pivoted on the tap body and pivotally connected to said sleeve, means engaging the lever mechanism to yieldingly move the tap body lengthwise with the chasers during part of the thread cutting operation, a trip ring adjustably mounted on the tap body to cause a relative movement of the chasers on the tap body to thereby complete the threading operation and collapse the chasers when a pre-determined length of thread is cut, and means for yieldingly holding the chasers in collapsed position when moving the tap body rearwardly.

8. A collapsing tap comprising a reciprocating, positively rotated tap body, said tap body having a plurality of lengthwise parallel slots in the periphery thereof, cases movably mounted in said slots and having removable chasers adjustably secured thereon, a sliding sleeve on the tap body to which the chasers are pivotally secured, a lever mechanism pivoted on the tap body and pivotally connected to said sleeve, means engaging the lever mechanism to yieldingly move the tap body lengthwise with the chasers during part of the thread cutting operation, a trip ring adjustably mounted on the tap body and arranged to cause a relative movement of the chasers on the tap body to thereby complete the threading operation and collapse the chasers when the pre-determined length of thread is cut, means for yieldingly holding the chasers in collapsed position when moving the tap body rearwardly, and means for actuating the said lever mechanism to move the collapsed chasers into thread cutting position on the tap body during the rearward movement of the tap body.

In testimony whereof, I have hereunto set my hand.

OSCAR W. BERG.